United States Patent [19]
Hayes, Jr.

[11] Patent Number: 5,884,188
[45] Date of Patent: Mar. 16, 1999

[54] RECEIVED SIGNAL SELECTION SYSTEM FOR COMBINED PAGER/CELLULAR TELEPHONE APPARATUS

[75] Inventor: John Joseph Hayes, Jr., Wake Forest, N.C.

[73] Assignee: Ericsson Inc., Research Triangle Park, N.C.

[21] Appl. No.: 715,468

[22] Filed: Sep. 18, 1996

[51] Int. Cl.$^6$ .............................. H04M 11/00; H04Q 7/08
[52] U.S. Cl. ...................... 455/552; 455/343; 455/426; 455/553
[58] Field of Search .................................. 455/426, 556, 455/422, 550, 343, 383, 575, 552, 84, 553

[56] References Cited

U.S. PATENT DOCUMENTS

| | | | |
|---|---|---|---|
| H610 | 3/1989 | Focarile et al. | 379/60 |
| 5,008,925 | 4/1991 | Pireh | 455/340 |
| 5,148,473 | 9/1992 | Freeland | 455/556 |
| 5,247,700 | 9/1993 | Wohl et al. | 455/552 |
| 5,479,485 | 12/1995 | Hayashi | 455/556 |
| 5,502,437 | 3/1996 | Marko et al. | 340/825 |
| 5,526,398 | 6/1996 | Okada et al. | 455/426 |
| 5,537,415 | 7/1996 | Miller et al. | 395/109 |
| 5,541,976 | 7/1996 | Ghisler | 455/556 |
| 5,550,895 | 8/1996 | Burson et al. | 455/552 |

FOREIGN PATENT DOCUMENTS

| 2 292 286 | of 0000 | United Kingdom . |
|---|---|---|
| WO 9400946 | 1/1994 | WIPO . |

*Primary Examiner*—Reinhard J. Eisenzopf
*Assistant Examiner*—Edan Orgad
*Attorney, Agent, or Firm*—Jenkens & Gilchrist

[57] ABSTRACT

A method for sharing a common receiver between a cellular telephone and a pager such that selectively tuning the receiver to receive cellular telephone system frequencies and pager system frequencies allows simultaneous operation as a cellular telephone and pager during periods when both devices are in sleep mode. The method includes prioritizing operation of one of the devices, anticipating the occurrence of both cellular system paging channel transmission and pager system paging channel transmission, and tuning the common receiver to the appropriate frequency band.

15 Claims, 8 Drawing Sheets

RECEIVED SIGNAL SELECTION SYSTEM FOR COMBINED PAGER/CELLULAR TELEPHONE APPARATUS

BACKGROUND OF THE INVENTION

1. Technical Field of the Invention

The present invention pertains in general to cellular telephones and pagers, and more particularly, to a method for selecting a radio signal to be received by a device possessing cellular telephone and pager capabilities and sharing a common receiver.

2. Description of Related Art

Reduced cost and wide spread acceptance of both cellular telephone and pager services has resulted in consumers desiring to subscribe to both cellular telephone and pager services. In the past, consumers had to purchase and carry a separate cellular telephone and paging device. To meet this market segment, manufacturers of cellular telephones and pagers have aggregated the two devices into a single unit. Such an aggregated unit is more convenient to carry than two separate devices. While the aggregated device may share some components such as a housing, a battery, a tone generator (ringer/beeper) and possibly an alphanumeric display between the cellular telephone and the pager, the aggregated unit is essentially two distinct devices capable of independent and simultaneous operation.

Due to the commonality of components between the pager and the cellular telephone, certain further components can also be shared between the devices thereby reducing duplication of components, reducing cost and furthering miniaturization. In particular, a significant savings can be realized by sharing the radio receiver. Although the radio frequencies for cellular telephones and pagers are different, it is well known in the industry to design a receiver capable of operation in different frequency bands. The drawback to sharing components, however, is that only one device can utilize these components at any given time and simultaneous operation of both devices is not possible.

It is well known in the industry that cellular telephones and pagers operate most of the time in sleep mode. In the sleep mode, the device, whether it be a cellular telephone or a pager, powers down all components except the receiver in an effort to conserve scarce battery power. Furthermore, the receivers themselves power down and activate or "awaken" only during allocated time periods during which they monitor a paging channel for notification of incoming traffic. The timing and frequency of the paging periods is well known and is specified by the particular protocol of the communication system (e.g., GSM, AMPS, POCSAG, etc.) and the identity of the mobile device.

Since current aggregations of cellular telephone/pager devices sharing a single receiver can operate only as a cellular telephone or pager at any given time, it would be advantageous to provide a method for sharing the receiver such that, in non-overlapping situations, the receiver monitors the cellular telephone paging channel during the cellular telephone paging time periods and monitors the pager paging channel during the pager paging time periods thereby providing simultaneous cellular telephone and pager service. There is also a need for a method of prioritizing the type of service that will be provided during time periods when the cellular telephone paging time period and pager paging time period overlap.

SUMMARY OF THE INVENTION

The present invention applies to a device wherein a cellular telephone and a pager are aggregated into a single unit and share a common receiver. In an effort to utilize the receiver to its fullest extent and provide the greatest extent of simultaneous operation of the cellular telephone and the pager possible, the present invention comprises a system for selecting the radio signal to be monitored by the receiver during the sleep mode.

Both cellular telephone and pager system protocols allow for the receivers of the mobile device to power down during non-traffic periods and activate during allocated paging time periods. During the paging time periods, the receivers must monitor the paging channel to determine if the base station of the particular communication system has incoming traffic for the mobile device. The allocated paging time periods are dictated by the protocol of the communication system and the identity of the mobile device. Once allocated, the paging time periods occur at a known frequency.

Following the method of the present invention, the cellular telephone or the pager of the aggregated device is given priority over the other. During time periods when the paging channel for the cellular telephone and the paging channel for the pager do not overlap, the receiver is tuned to receive the cellular telephone paging channel and the pager paging channel during their respective time periods. As long as overlap of the paging channels does not occur and there is no incoming traffic, the aggregated device operates as both a cellular telephone and a pager. When overlap occurs, the paging channel of the device assigned priority is monitored and the aggregated device operates only as the prioritized device. Additionally, if the aggregated device detects incoming traffic for the pager or cellular telephone, it operates only as that device during receipt of the traffic.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

In the past, pagers and cellular telephones have been separate devices that operated independently. Increasingly, there is a desire to combine these devices into a single aggregated device. To reduce cost and increase miniaturization, it is advantageous to eliminate redundant components and share common components including the radio receiver. Such a shared receiver would necessarily be capable of receiving radio frequencies from both the cellular telephone frequency bands and pager frequency bands. During operation as a cellular telephone, the aggregated device would tune the receiver to the cellular telephone frequency band. Likewise, during operation as a pager, the aggregated device would tune the receiver to the pager frequency band. The obvious drawback, however, is that the aggregated device must be tuned to either the cellular telephone or pager frequency band at any given time and cannot simultaneously receive both frequency bands.

The present invention exploits the fact that both cellular telephones and pagers spend a majority of the time in sleep mode. While in the sleep mode, these devices activate the receiver to monitor a paging channel during a predetermined time period which reoccurs at a known frequency. The purpose of this signal is to notify the device when incoming traffic destined for that particular unit exists. If while monitoring the respective paging channels, the cellular telephone or pager determines that incoming traffic for their device may be forthcoming, they must power up the respective device and receive the incoming traffic. The timing of the paging channel is determined by the protocol of the particular communication system and the identity number of the particular device. The use of paging channels and operation of sleep mode is well known in the industry.

Figure 1:
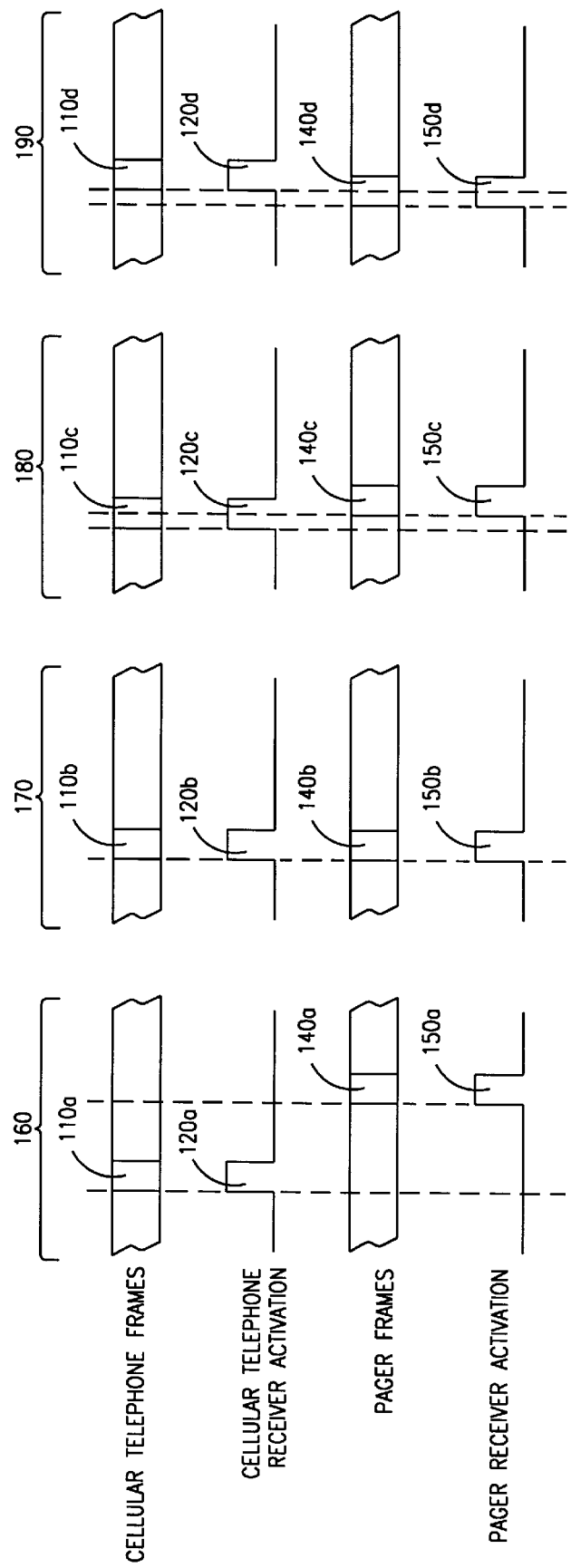
FIG. 1 is a timing diagram for a paging channel of a cellular telephone and a pager and activation signals for their respective receivers.

Referring now to FIG. 1, there is illustrated a timing diagram for a paging channel of a cellular telephone and a pager and activation signals for their respective receivers. The cellular telephone sleep pattern and the pager sleep pattern generally have different periods, phases, and duty cycles. Therefore, occasional conflicts inevitably arises wherein both the cellular telephone and the pager need to activate at the same time and require simultaneous access to the shared resources in order to monitor the paging channel. Four general scenarios can arise and are illustrated in FIG. 1. The cellular telephone transmissions include timing intervals 110a through 110d when the cellular telephone needs to monitor the cellular telephone paging channel to determine if the cellular telephone network wants to get in contact with the cellular telephone. During these intervals, the cellular telephone receiver becomes active and remains active for the duration of the interval as represented by timing signals 120a through 120d. Likewise, the pager transmissions include timing intervals 140a through 140d when the pager needs to monitor the pager paging channel to determine if the paging system needs to be in contact with the pager. During these intervals, the pager receiver becomes active and remains active for the duration of the interval as represented by timing signals 150a through 150d.

The group of signals in column 160 represents a scenario where there is no overlap between the timing of the cellular telephone paging channel transmission 110a and the pager paging channel transmission 140a. Therefore, no conflict exists. The group of signals in column 170 represents a scenario where conflict exists due to the simultaneous transmission of the cellular telephone paging channel 110b and the pager paging channel 140b. The group of signals in column 180 represents a scenario where conflict exists due to overlap of the cellular telephone paging channel 110c and the pager paging channel 140c when the cellular paging channel transmission begins, but does not complete, prior to the start of the pager paging channel transmission. Conversely, the group of signals in column 190 represents a scenario where conflict exists due to overlap of the cellular telephone paging channel 110d and the pager paging channel 140d when the pager paging channel begins, but does not complete, prior to the start of the cellular paging channel transmission.

The present invention exploits the fact that in most instances, overlap of the two paging channels will not occur. In this scenario, the receiver can repeatedly be switched between the two frequency bands and provide simultaneous operation as both a pager and cellular telephone. The present invention provides for selecting a prioritized mode of operation such that when a conflict between the cellular telephone and the pager occurs, the frequency band of the prioritized device is selected.

Figure 2:
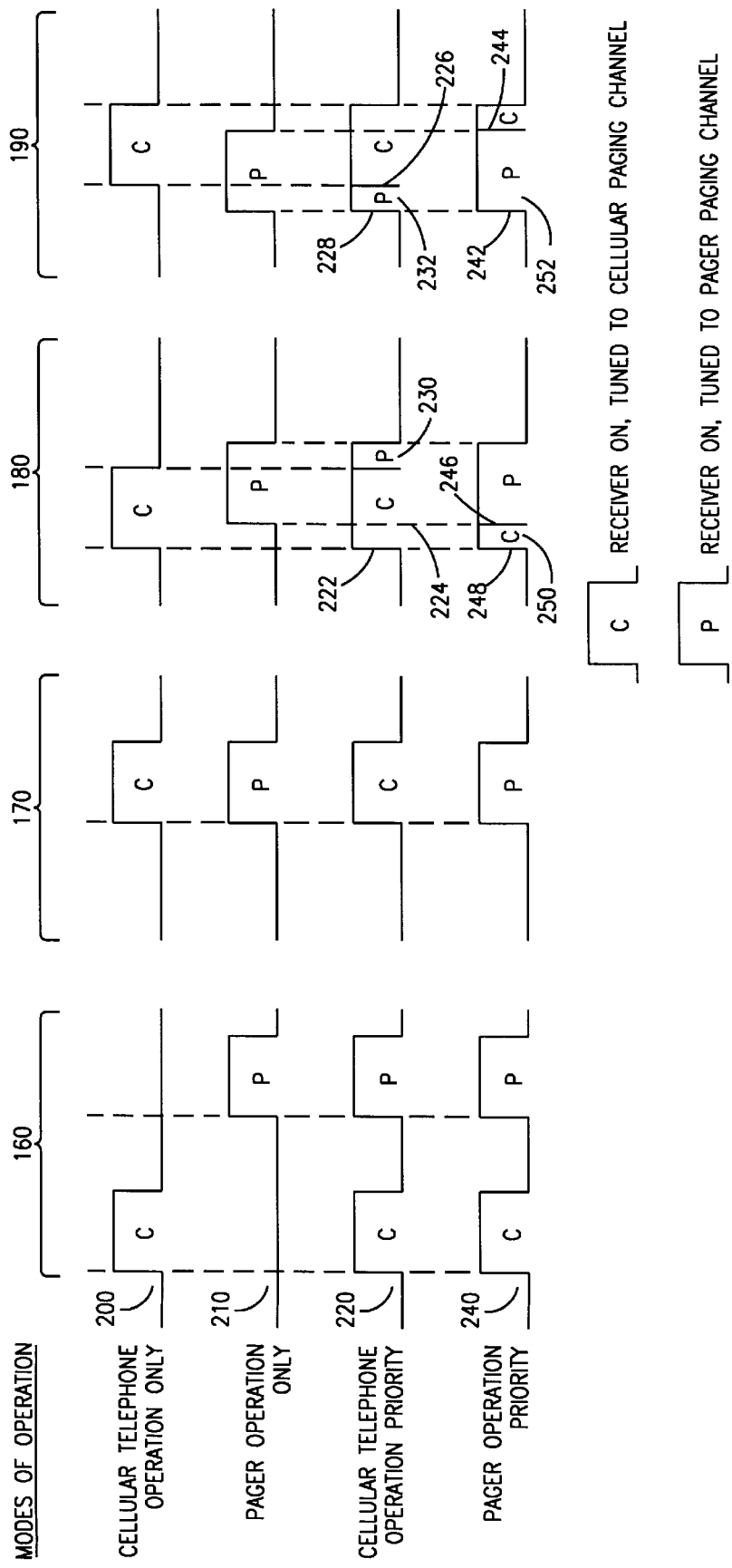
FIG. 2 is a timing diagram illustrating activation and frequency selection for the various modes of operation available under the present invention.

Referring now to FIG. 2, there is a timing diagram illustrating the activation and frequency selection for the various modes of operation available under the present invention. Operation of the aggregated device as a cellular telephone only with activation of the receiver tuned to the cellular telephone frequency band is represented by the series of receiver activation signals 200. In this mode, the aggregated device operates only as a cellular telephone whether there is no overlap as represented in column 160, complete overlap as represented in column 170, or partial overlap as represented in columns 180 and 190.

Operation of the aggregated device as a pager only with activation of the receiver tuned to the pager frequency band is represented by the series of receiver activation signals 210. In this mode, the aggregated device operates only as a pager whether there is no overlap as represented in column 160, complete overlap as represented in column 170, or partial overlap as represented in columns 180 and 190.

The third mode of operation gives priority to operation as a cellular telephone when a conflict between the timing of the cellular telephone paging channel and the pager paging channel occurs as represented by the series of receiver activation signals 220. In this mode, the aggregated device monitors both the cellular telephone paging channel and the pager paging channel when no overlap occurs as represented by column 160. When simultaneous overlap occurs, the aggregated device tunes the receiver to the cellular telephone frequency band as represented by column 170. When partial overlap of the cellular telephone paging channel and the pager paging channel occurs as represented in columns 180 and 190, the aggregated device tunes the receiver to the cellular telephone frequency band at the beginning of the cellular telephone paging channel time period and remain so tuned for the full duration of the cellular telephone paging channel time period. This is the case regardless if the beginning edge of the cellular telephone paging channel time period 222 occurs before the beginning edge of the pager paging channel time period 224 or if the beginning edge of the cellular telephone paging channel time period 226 occurs after the beginning edge of the pager paging channel time period 228.

In one embodiment of the present invention, the aggregated device tunes the receiver to the pager frequency band during the partial pager paging time periods 230 and 232. In another embodiment of the present invention, the aggregated device anticipates the partial overlap and places the receiver in a deactivated state during the partial pager paging channel time period in order to conserve battery power.

The fourth mode of operation gives priority to operation as a pager when conflict between the timing of the cellular telephone paging channel and the pager paging channel occurs as represented by the series of receiver activation signals 240. In this mode, the aggregated device monitors both the cellular telephone paging channel and the pager paging channel when no overlap occurs as represented by column 160. When simultaneous overlay occurs, the aggregated device tunes the receiver to the pager frequency band as represented by column 170. When partial overlap of the cellular telephone paging channel and the pager paging channel occurs as represented in columns 180 and 190, the aggregated device tunes the receiver to the pager frequency band at the beginning of the pager paging channel time period and remain so tuned for the full duration of the pager paging channel time period. This is the case regardless if the beginning edge of the pager paging channel time period 242 occurs before the beginning edge of the cellular telephone paging channel time period 244 or if the beginning edge of the pager paging channel time period 246 occurs after the beginning edge of the cellular telephone paging channel time period 248.

In one embodiment of the present invention, the aggregated device tunes the receiver to the cellular telephone frequency band during the partial cellular telephone paging time periods 250 and 252. In another embodiment of the present invention, the aggregated device anticipates the partial overlap and place the receiver in a deactivated state during the partial cellular telephone paging channel time period in order to conserve battery power.

Figure 3:
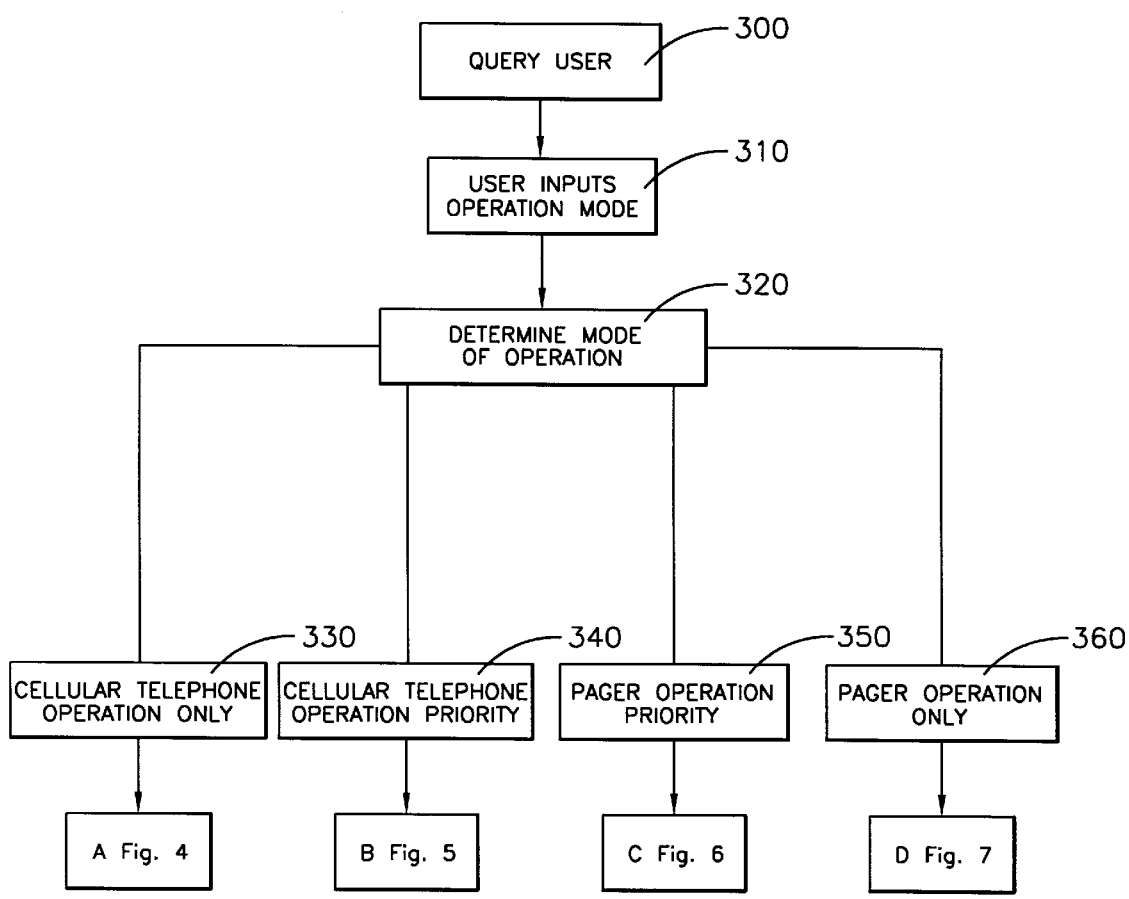
FIG. 3 is a flow diagram illustrating the operation of the aggregated device when selecting the mode of operation.

FIG. 3 through FIG. 7 taken together illustrate a flow diagram for the operation of the present invention. Referring now to FIG. 3, there is a flow diagram illustrating the operation of the aggregated device when selecting the mode of operation. Upon power up, the aggregated device queries the user to input the mode of operation (step 300) whereupon the user selects between the four modes of operation (step 310). The aggregated device then determines the mode of operation (step 320) and places the aggregated device in the selected operating modes with the possibilities being: cellular telephone operation only (step 330); cellular telephone operation priority (step 340); pager operation priority (step 350); or pager operation only (step 360).

Figure 4:
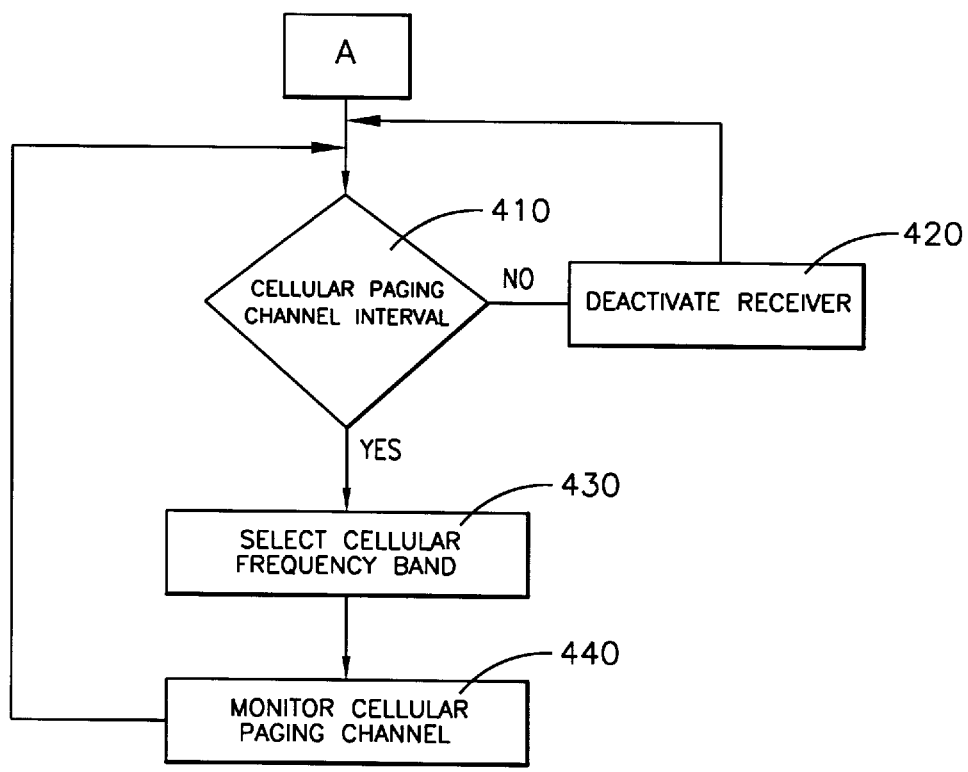
FIG. 4 is a flow diagram illustrating the operation of the aggregated device while in the cellular telephone only mode.

Referring now to FIG. 4, there is a flow diagram illustrating the operation of the aggregated device while in the cellular telephone operation only mode. Referencing back to A of FIG. 3, the aggregated device determines whether it is presently time for a cellular telephone paging channel interval to occur (step 410). This determination can be accomplished through the use of a timer which repeatedly counts the time period between occurrences of the cellular telephone paging channel transmission. This time period is specified by the communication system protocol and is synchronized with the base station using the synchronization methods of the particular communication system. If it is determined that the cellular telephone paging channel is not currently active, the aggregated device powers down the receiver and other circuits as allowed by the sleep mode operation (step 420) and remains in the sleep mode until the next interval.

If, on the other hand, it is determined that it is presently time to monitor the cellular telephone paging channel, the aggregated device selects the cellular telephone frequency band (step 430) and the receiver monitors the cellular telephone paging channel (step 440). Under the cellular telephone operation only mode, the aggregated device repeatedly monitors the cellular telephone paging channel during the appropriate time periods and never tune the receiver to the pager frequency band.

Figure 5:
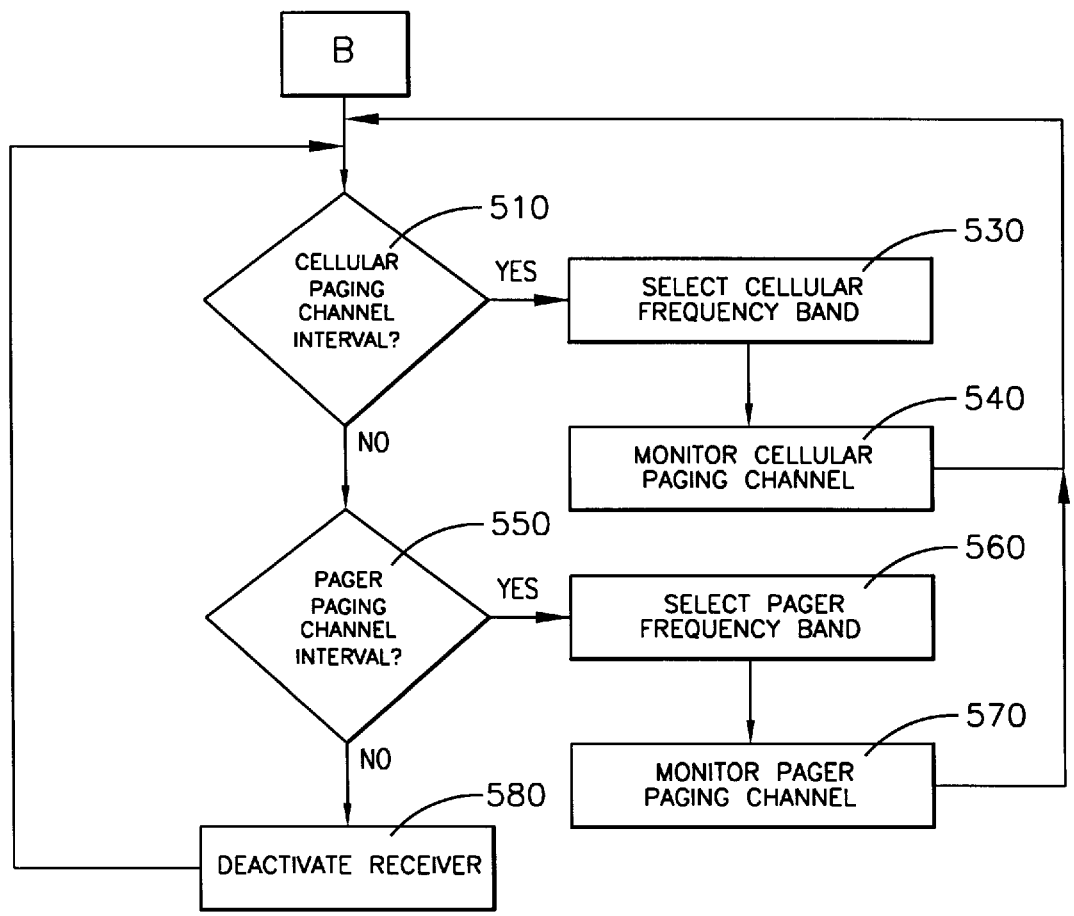
FIG. 5 is a flow diagram illustrating the operation of the aggregated device while in the cellular telephone operation priority mode.

Referring now to FIG. 5, there is a flow diagram illustrating the operation of the aggregated device while in the cellular telephone operation priority mode. Referencing back to B of FIG. 3, the aggregated device now determines whether it is presently time for a cellular paging channel interval to occur (step 510). If it is determined that it is presently time to monitor the cellular paging channel, the aggregate device selects the cellular telephone frequency band (step 530) and the receiver monitors the cellular paging channel (step 540). If, on the other hand, it is determined that the cellular telephone paging channel is not currently active, the aggregated device now determines whether it is presently time for a pager paging channel interval to occur (step 550). As with the cellular telephone paging channel, this determination can be accomplished through the use of a timer, which repeatedly counts the time period between occurrences of the pager paging channel transmission. This time is specified by the communication system protocol and is synchronized with the base station using the synchronization methods of the particular communication system. If it is determined that it is presently time to monitor the pager paging channel, the aggregated device selects the pager frequency band (step 560) and the receiver monitors the pager paging channel (step 570). The receiver monitors the pager paging channel only for the duration of the pager paging channel transmission and then returns to step 510. If, on the other hand, it is determined that it is not presently time to monitor the pager paging channel, the aggregated device deactivates the receiver and begins the process again.

In a first embodiment of the present invention, the aggregated device in step 550 anticipates the occurrence of a cellular paging channel transmission prior to expiration of the pager paging channel transmission and does not allow transition to step 560 even though it is time for a pager paging channel transmission and instead, transitions to step 580. In a second embodiment of the present invention, the aggregated device transitions from step 550 to step 560 even though it anticipates the occurrence of a cellular paging channel transmission prior to expiration of the pager paging channel transmission but ceases to monitor the pager paging channel transmission just prior to the occurrance of the cellular paging channel transmission and returns to step 510.

Figure 6:
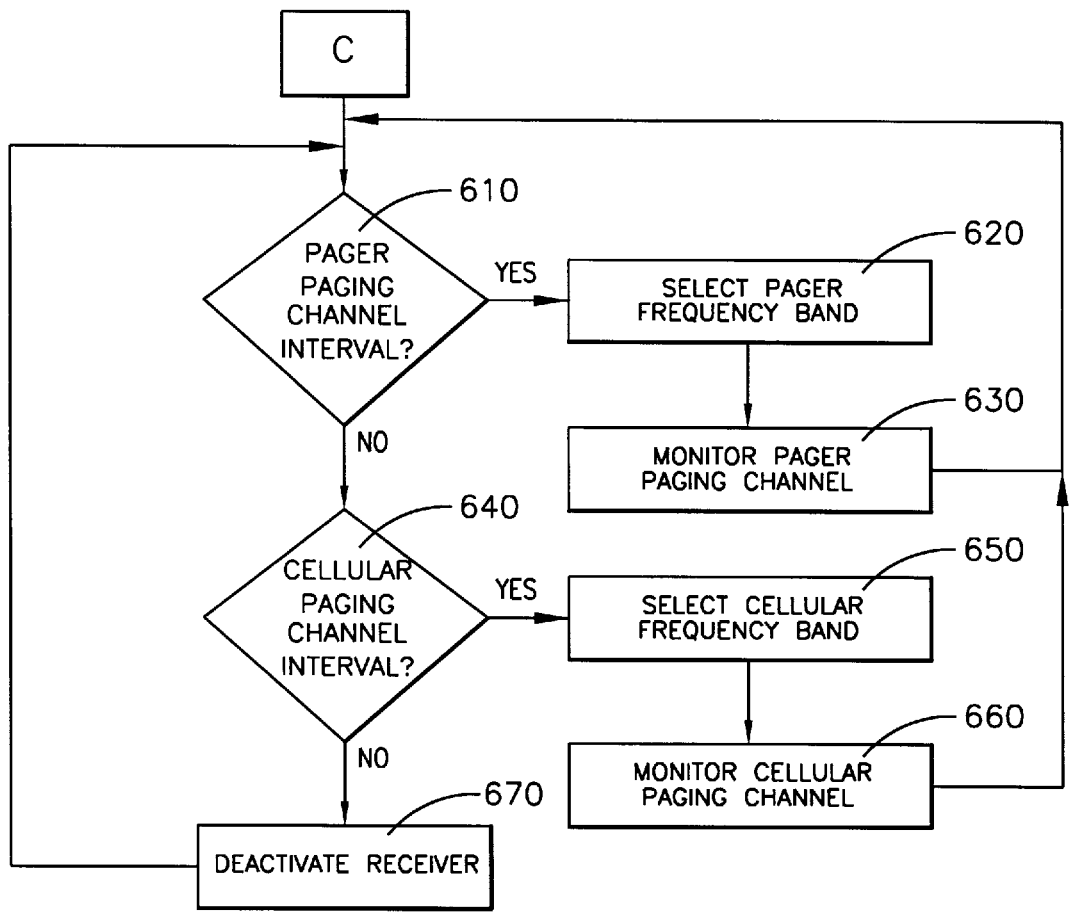
FIG. 6 is a flow diagram illustrating the operation of the aggregated device while in the pager operation priority mode.

Referring now to FIG. 6, there is a flow diagram illustrating the operation of the aggregated device while in the pager operation priority mode. Referencing back to C of FIG. 3, the aggregated device now determines whether it is presently time for a pager paging channel interval to occur (step 610). If it is determined that it is presently time to monitor the paging pager channel, the aggregated device selects the pager frequency band (step 620) and the receiver monitors the pager paging channel (step 630). If, on the other hand, it is determined that the pager paging channel is not currently active, the aggregated device determines whether it is presently time for a cellular telephone paging channel interval to occur (step 640). If it is determined that it is presently time to monitor the cellular telephone paging channel, the aggregated device selects the cellular telephone frequency band (step 650) and the receiver monitors the cellular telephone paging channel (step 660). The receiver monitors the cellular paging channel only for the duration of the cellular paging channel transmission and then returns to step 610. If it is determined that the cellular telephone paging channel is not currently active, the aggregated device powers down the receiver and other circuits as allowed by sleep mode operation (step 670) and begins the process again.

In a first embodiment of the present invention, the aggregrated device in step 640 anticipates the occurrance of a pager paging channel transmission prior to expiration of the cellular paging channel transmission and does not allow transition to step 650 even though it is time for a cellular paging channel transmission and instead, transitions to step 670. In a second embodiment of the present invention, the aggregated device transitions from step 640 to step 650 even though it anticipates the occurrance of a pager paging channel transmission prior to expiration of the cellular paging channel transmission but ceases to monitor the cellular paging channel transmission just prior to the occurrance of the pager paging channel transmission and returns to step 610.

Figure 7:
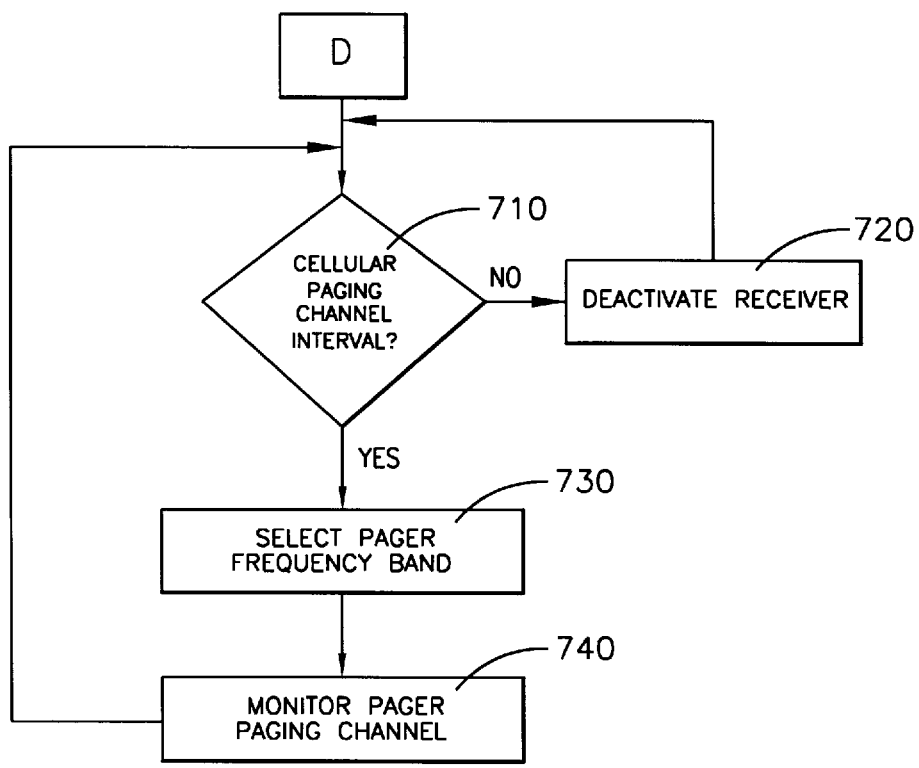
FIG. 7 is a flow diagram illustrating the operation of the aggregated device while in the pager operation only mode.

Referring now to FIG. 7, there is a flow diagram illustrating the operation of the aggregated device while in the pager operation only mode. Referencing back to D of FIG. 3, the aggregated device now determines whether it is presently time for a pager paging channel interval to occur (step 710). If it is determined that the pager paging channel is not currently active, the aggregated device powers down the receiver (step 720) and remain in the sleep mode until the next interval. If, on the other hand, it is determined that it is presently time to monitor the pager paging channel, the aggregated device selects the pager frequency band (step 730) and the receiver monitors the pager paging channel (step 740). Under the pager operation only mode, the aggregated device repeatedly monitors the pager paging channel during the appropriate time periods and never tune the receiver to the cellular telephone frequency band.

Figure 8:
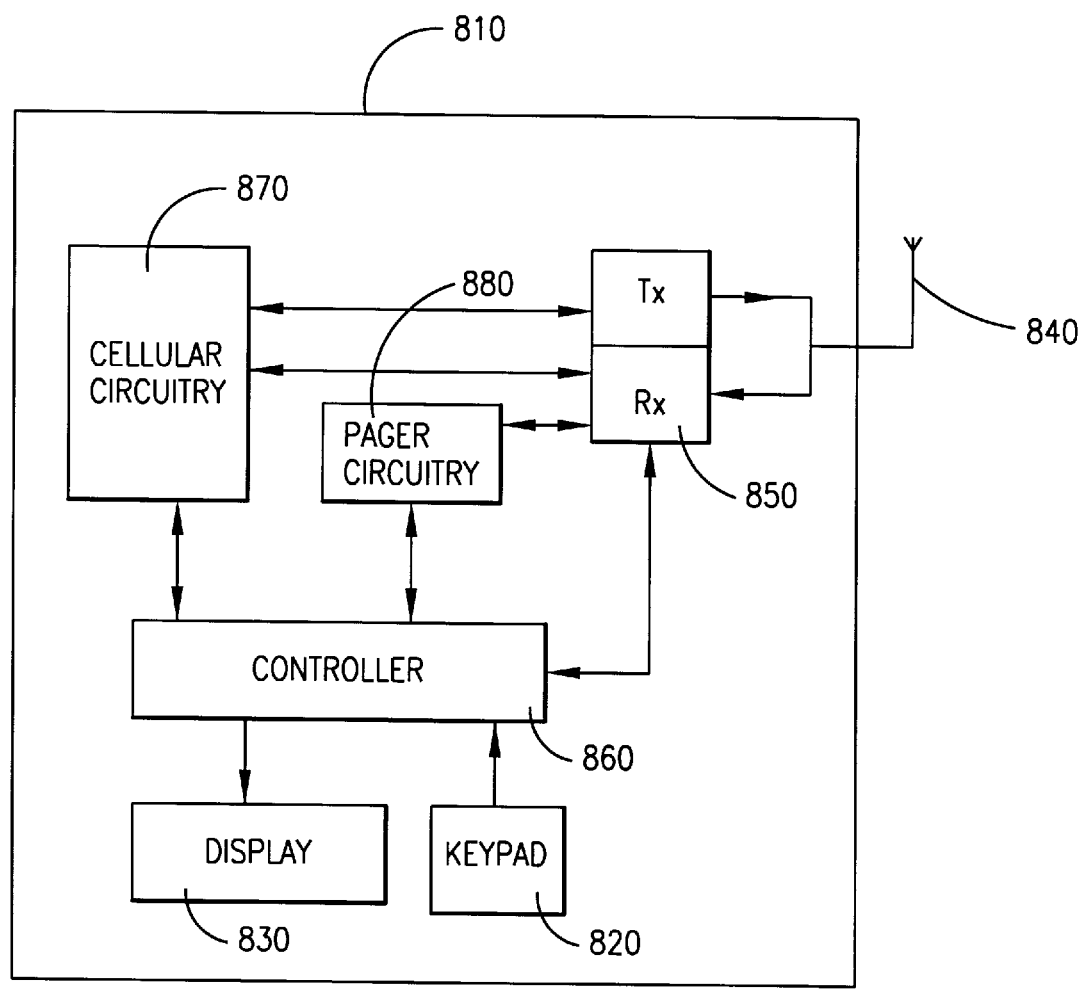
FIG. 8 is a simplified block diagram illustrating an aggregated device comprising a cellular telephone and pager sharing a common single receiver.

Referring now to FIG. 8, there is illustrated a simplified block diagram of an aggregated device comprising a cellular telephone and pager sharing a single common receiver. The aggregated device 810 includes the following commonly shared components: a keypad 820, an alphanumeric display 830, an antenna 840, a receiver 850 and a controller 860. The aggregated device 810 also contains cellular telephone circuitry 870 for implementing the remaining functionality of a cellular telephone and pager circuitry 880 for implementing the remaining functionality of a pager. The controller 860 maintains timing status information of the cellular telephone paging channel transmissions and timing status information of the pager paging channel transmissions. The controller 860 also stores the mode of operation of the aggregated device 810 entered by the user. The controller obtains the mode of operation by using the alphanumeric display 830 to query the user to enter the mode of operation using the keypad 820 (see FIG. 3). Based on the selected mode of operation and the timing status of the cellular telephone paging channel transmission and the pager paging channel transmission, the controller 860 selectively tunes and activates the receiver 850 to receive the appropriate paging channel transmission (see FIGS. 4–7). This paging channel transmission is provided to the cellular telephone circuitry 850 and pager circuitry 880 for selective processing.

The description of the present invention thus far, has only included operation of the aggregated device in sleep mode. If, during monitoring of the cellular telephone paging channel or during monitoring of the pager paging channel either the cellular telephone or the pager determines that there is incoming traffic directed to the respective devices, the aggregated device tunes the common receiver to receive the incoming traffic and during that period only operates as a cellular telephone or pager depending on the type of traffic received.

Although the description of the invention describes the common receiver being shared by a cellular telephone and a pager, the invention is equally applicable to any number of wireless devices sharing a common receiver.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for jointly operating a first wireless communication device and a second wireless communication device where the first wireless communication device and the second wireless communication device share a common receiver comprising:

means for prioritizing operation of either the first wireless communication device or the second wireless communication device;

means for anticipating occurrences of the first wireless communication device paging channel transmissions and of the second wireless communication device paging channel transmissions;

means for tuning the common receiver to the first wireless communication device paging channel transmission during the anticipated occurrence of the first wireless communication device paging channel transmission and to the second wireless communication device paging channel transmission during the anticipated occurrence of the second wireless communication device paging channel transmission when no overlap exists between the first wireless communication device paging channel transmission and the second wireless communication device paging channel transmission;

means for tuning the common receiver to the first wireless communication device paging channel transmission during the anticipated occurrence of the first wireless communication device paging channel transmission when operation of the first wireless communication device is prioritized and an overlap exists between the first wireless communication device paging channel transmission and the second wireless communication device paging channel transmission; and means for tuning the common receiver to the second wireless communication device paging channel transmission during the anticipated occurrence of the second wireless communication device paging channel transmission when operation of the second wireless communication device is prioritized and an overlap exists between the first wireless communication device paging channel transmission and the second wireless communication device paging channel transmission.

2. A system for jointly operating a cellular telephone in a cellular telephone system and a pager in a pager system where the cellular telephone and the pager share a common receiver comprising:

means for prioritizing operation of either the cellular telephone or the pager;

means for anticipating occurrences of the cellular system paging channel transmissions and of the pager system paging channel transmissions;

means for tuning the common receiver to the cellular system paging channel transmission during the anticipated occurrence of the cellular system paging channel transmission and to the pager system paging channel transmission during the anticipated occurrence of the pager system paging channel transmission when no overlap exists between the cellular system paging channel transmission and the pager system paging channel transmission;

means for tuning the common receiver to the cellular system paging channel transmission during the anticipated occurrence of the cellular system paging channel transmission when cellular telephone operation is prioritized and an overlap exists between the cellular system paging channel transmission and the pager system paging channel transmission; and means for tuning the common receiver to the paging system paging channel transmission during the anticipated occurrence of the paging system paging channel transmission when pager operation is prioritized and an overlap exists between the cellular system paging channel transmission and the pager system paging channel transmission.

3. The combined cellular telephone and pager device of claim 2, wherein the modes of operation comprise a cellular telephone operation only mode, a pager operation only mode, a cellular telephone operation priority mode, or a pager operation priority mode.

4. The combined cellular telephone and pager device of claim 3, wherein the means for selectively tuning the common receiver tunes to the cellular system paging channel for operation of the combined device as a cellular telephone when the selected mode of operation is the cellular telephone operation only mode.

5. The combined cellular telephone and pager device of claim 3, wherein the means for selectively tuning the common receiver tunes to the pager system paging channel for operation of the combined device as a pager when the selected mode of operation is the pager operation only mode.

6. The combined cellular telephone and pager device of claim 3, wherein the means for selectively tuning the common receiver tunes to the cellular system paging channel during the anticipated occurrence of the cellular system paging channel transmission when the selected mode of operation is the cellular telephone operation priority mode and an overlap exists between the cellular system paging channel transmission and the pager system paging channel transmission.

7. The combined cellular telephone and pager device of claim 3, wherein the means for selectively tuning the common receiver tunes to the pager system paging channel during the anticipated occurrence of the pager system paging channel transmission when the selected mode of operation is the pager operation priority mode and an overlap exists between the cellular system paging channel transmission and the pager system paging channel transmission.

8. The combined cellular telephone and pager device of claim 3, wherein the means for selectively tuning the common receiver tunes the common receiver to the cellular system paging channel during the anticipated occurrence of the cellular system paging channel transmission and tunes to the pager system paging channel during the anticipated occurrence of the pager system paging channel transmission, when the selected mode of operation is either the cellular telephone operation priority mode or the pager operation priority mode and no overlap exists between the cellular system paging channel transmission and the pager system paging channel transmission.

9. A method for jointly operating a cellular telephone in a cellular telephone system and a pager in a pager system where the cellular telephone and the pager share a common receiver comprising the steps of:

prioritizing operation of either the cellular telephone or the pager;

anticipating occurrences of the cellular system paging channel transmissions and of the pager system paging channel transmissions;

tuning the common receiver to the cellular system paging channel transmission during the anticipated occurrence of the cellular system paging channel transmission and to the pager system paging channel transmission during the anticipated occurrence of the pager system paging channel transmission when no overlap exists between the cellular system paging channel transmission and the pager system paging channel transmission;

tuning the common receiver to the cellular system paging channel transmission during the anticipated occurrence of the cellular system paging channel transmission when the cellular telephone operation is prioritized and an overlap exists between the cellular system paging channel transmission and the pager system paging channel transmission; and tuning the common receiver to the paging system paging channel transmission during the anticipated occurrence of the paging system paging channel transmission when pager operation is prioritized and an overlap exists between the cellular system paging channel transmission and the pager system paging channel transmission.

10. The method for selectively tuning to a cellular system paging channel transmission and a pager system paging channel transmission of claim 9, wherein the modes of operation comprise a cellular telephone operation only mode, a pager operation only mode, a cellular telephone operation priority mode, or a pager operation priority mode.

11. The method for selectively tuning to a cellular system paging channel transmission and a pager system paging channel transmission of claim 10, wherein the step of selectively tuning the common receiver includes tuning to the cellular system paging channel for operation of the combined device as a cellular telephone when the selected mode of operation the cellular telephone operation only mode.

12. The method for selectively tuning to a cellular system paging channel transmission and a pager system paging channel transmission of claim 10, wherein the step of selectively tuning the common receiver includes tuning to the pager system paging channel for operation of the combined device as a pager when the selected mode of operation is the pager operation only mode.

13. The method for selectively tuning to a cellular system paging channel transmission and a pager system paging channel transmission of claim 10, wherein the step of selectively tuning the common receiver includes tuning to the cellular system paging channel during the anticipated occurrence of the cellular system paging channel transmission when the selected mode of operation is the cellular telephone operation priority mode and an overlap exists between the cellular system paging channel transmission and the pager system paging channel transmission.

14. The method for selectively tuning to a cellular system paging channel transmission and a pager system paging channel transmission of claim 10, wherein the step of selectively tuning the common receiver includes tuning to the pager system paging channel during the anticipated occurrence of the pager system paging channel transmission when the selected mode of operation is the pager operation priority mode and an overlap exists between the cellular system paging channel transmission and the pager system paging channel transmission.

15. The method for selectively tuning to a cellular system paging channel transmission and a pager system paging channel transmission of claim 10, wherein the step of selectively tuning the common receiver includes tuning the common receiver to the cellular paging channel during the anticipated occurrence of the cellular system paging channel transmission and tuning to the pager system paging channel during the anticipated occurrence of the pager system paging channel transmission when the selected mode of operation is either the cellular telephone operation priority mode or the pager operation priority mode and no overlap exists between the cellular system paging channel transmission and the pager system paging channel transmission.

* * * * *